United States Patent [19]
Vanmoor

[11] Patent Number: 6,003,486
[45] Date of Patent: Dec. 21, 1999

[54] RADIAL VANE ROTARY INTERNAL COMBUSTION ENGINE

[76] Inventor: Arthur Vanmoor, 18761 W. Dixie Hwy., North Miami Beach, Fla. 33180

[21] Appl. No.: 08/715,930

[22] Filed: Sep. 19, 1996

[30] Foreign Application Priority Data

| Sep. 19, 1995 | [NL] | Netherlands | 1001232 |
| Sep. 20, 1995 | [NL] | Netherlands | 1001241 |
| Nov. 27, 1995 | [NL] | Netherlands | 1001745 |
| Dec. 26, 1995 | [NL] | Netherlands | 1001991 |
| Jan. 4, 1996 | [NL] | Netherlands | 1002018 |
| Jan. 11, 1996 | [NL] | Netherlands | 1002051 |
| Jan. 22, 1996 | [NL] | Netherlands | 1002137 |
| May 1, 1996 | [NL] | Netherlands | 1002972 |

[51] Int. Cl.$^6$ .................................................. F02B 53/00
[52] U.S. Cl. ........................................ 123/249; 418/196
[58] Field of Search ................................ 123/237, 249; 418/61.2, 196

[56] References Cited

U.S. PATENT DOCUMENTS

| 571,377 | 11/1896 | Kryszat | 418/196 |
| 644,256 | 2/1900 | Montgomery . | |
| 753,086 | 2/1904 | Mains . | |
| 813,854 | 2/1906 | Burlich | 418/196 |
| 900,410 | 10/1908 | Minor . | |
| 932,463 | 8/1909 | Goyette . | |
| 1,249,881 | 12/1917 | Anglada . | |
| 1,268,794 | 6/1918 | Harris et al. | 123/249 |
| 1,974,761 | 9/1934 | Vogel . | |
| 2,152,564 | 3/1939 | Perkins | 418/196 |
| 2,390,880 | 12/1945 | Harrold | 418/196 |
| 2,935,027 | 5/1960 | Monteil | 418/196 |
| 3,301,233 | 1/1967 | Dotto et al. . | |
| 3,779,216 | 12/1973 | Britt . | |
| 3,782,110 | 1/1974 | Kobayashhi . | |
| 3,894,819 | 7/1975 | Imaizumi et al. | 418/61.2 |
| 4,075,981 | 2/1978 | Durst . | |
| 5,429,084 | 7/1995 | Cherry et al. . | |

FOREIGN PATENT DOCUMENTS

| 550 353 | 3/1923 | France . | |
| 1055946 | 10/1953 | France | 123/237 |
| 1066678 | 1/1954 | France | 123/249 |
| 265659 | 1/1927 | United Kingdom | 123/237 |
| 1 235 671 | 6/1971 | United Kingdom . | |

*Primary Examiner*—Michael Koczo
*Attorney, Agent, or Firm*—Herbert L. Lerner; Laurence A. Greenberg; Werner H. Stemer

[57] ABSTRACT

A rotary internal combustion engine has a cylindrical rotor which rotates in a cylindrical rotor chamber of a stator. A cylindrical peripheral surface of the rotor rotates equidistantly from the housing wall of the rotor housing. A plurality of vanes project radially from the peripheral surface of the rotor and they sealing against the inner wall surface of the rotor housing. Several turning or reciprocating valves are equi-angularly distributed about a periphery of the housing chamber. The valves seal against the rotor periphery and they open up for the vanes to pass by.

1 Claim, 9 Drawing Sheets

RADIAL VANE ROTARY INTERNAL COMBUSTION ENGINE

BACKGROUND OF THE INVENTION

1. Field of the Invention

The invention relates to internal combustion engines and, in particular, to rotary internal combustion engines driven by the sequential combustion of combustible fuel in a plurality of internal combustion chambers.

2. Description of the Related Art

A considerable amount of research in rotary cycles was done in the 1920's and 1930's. Many types of rotary cycles were considered. The development lead to the most famous of rotary engines, namely the Wankel engine. Many mechanical problems were solved during that time. However, even though the rotary cycle is superior to the Otto cycle in all theoretical thermodynamic calculations, only one large series automobile, i.e., the Mazda RX-7, utilizes the Wankel cycle.

The instantly proposed system deviates considerably from the Wankel system, most notably in the differences regarding compression. A certain amount of teaching may nevertheless be transferred, for instance seal and spark plug placement information.

Most prior art rotary engines utilize the rotor to compress the fuel/air mixture directly in the combustion chamber. The rotor is thereby radially asymmetric, it is mounted eccentrically relative to the rotor chamber, or the chamber is not circular. Examples of such engines are found in U.S. Pat. Nos. 4,075,981 to Durst, 3,301,233 to Dotto et al., and 3,782,110 to Kobayashi, respectively. An alternative design was recently proposed in U.S. Pat. No. 5,429,084 to Cherry et al. where the rotor and the chamber are radially symmetrical and the combustion chambers are instead formed laterally on either sides of the rotor and several vanes move axially to close off the combustion chambers. The compression "stroke" is effected by the narrowing of the combustion chamber during the angular displacement of rotor relative to the rotor housing (the stator) and the reduction in chamber volume effected by the respective vane.

As noted above, the rotary cycle is superior to the Otto cycle on paper. In reality, however, Otto cycle engines are quite principally better in terms of thermodynamic efficiency. Whether or not this has anything to do with the fact that much more research has been invested in the Otto cycle as compared to the rotary cycle cannot be easily answered. It should be possible, however, to improve a rotary engine further so that its actual efficiency approaches the theoretical limits more closely.

SUMMARY OF THE INVENTION

It is accordingly an object of the invention to provide a rotary internal combustion engine, which overcomes the above-mentioned disadvantages of the heretofore-known devices and methods of this general type and which is generally improved in its efficiency.

With the foregoing and other objects in view there is provided, in accordance with the invention, a rotary internal combustion engine, comprising:

a stator defining a rotor housing with a cylindrical inner wall surface, a rotor rotatably supported in said housing about a rotor axis, said rotor having a cylindrical peripheral surface rotating equidistantly from said inner wall surface of said stator;

a plurality of vanes projecting substantially radially from said peripheral surface of said rotor and sealing against said inner wall surface of said stator;

a plurality of turning valves equi-angularly distributed about a periphery of said housing chamber, said turning valves sealing against said peripheral surface of said rotor and, while allowing a respective one of said vanes to pass by, sealing against the respective said vane.

In accordance with an added feature of the invention, each of said turning valves rotate about an axis extending parallel to said rotor axis and coinciding with said inner wall surface of said rotor housing.

In accordance with an additional feature of the invention, said plurality of vanes are a number at least one higher than a number of said plurality of turning valves.

Preferably, a ratio of vanes to turning valves is from 1 to 2, in particular 8:5. The latter ratio has been found to lead to a particularly smooth cycle. The ratio may be varied widely, however, in dependence on the output requirements of the system.

In accordance with the invention there is also provided an improved internal combustion engine of the type having a plurality of cylinders and a plurality of reciprocating pistons disposed in said cylinders, said pistons sequentially performing selective strokes including a power stroke and an exhaust stroke. The improvement comprises: a compression system disposed externally of the cylinders for compressing a fuel/air mixture and for injecting the compressed fuel/air mixture into the cylinders following an exhaust stroke of the respective piston.

In accordance with yet another feature of the invention, the compression system includes a pressure vessel for storing a fuel/air mixture and a line communicating with each of the cylinders for injecting the fuel/air mixture into the cylinders.

In accordance with a concomitant feature of the invention, the compression system is a variable pressure system allowing injection of a compressed fuel/air mixture at varying pressure.

Other features which are considered as characteristic for the invention are set forth in the appended claims.

Although the invention is illustrated and described herein as embodied in a rotary internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
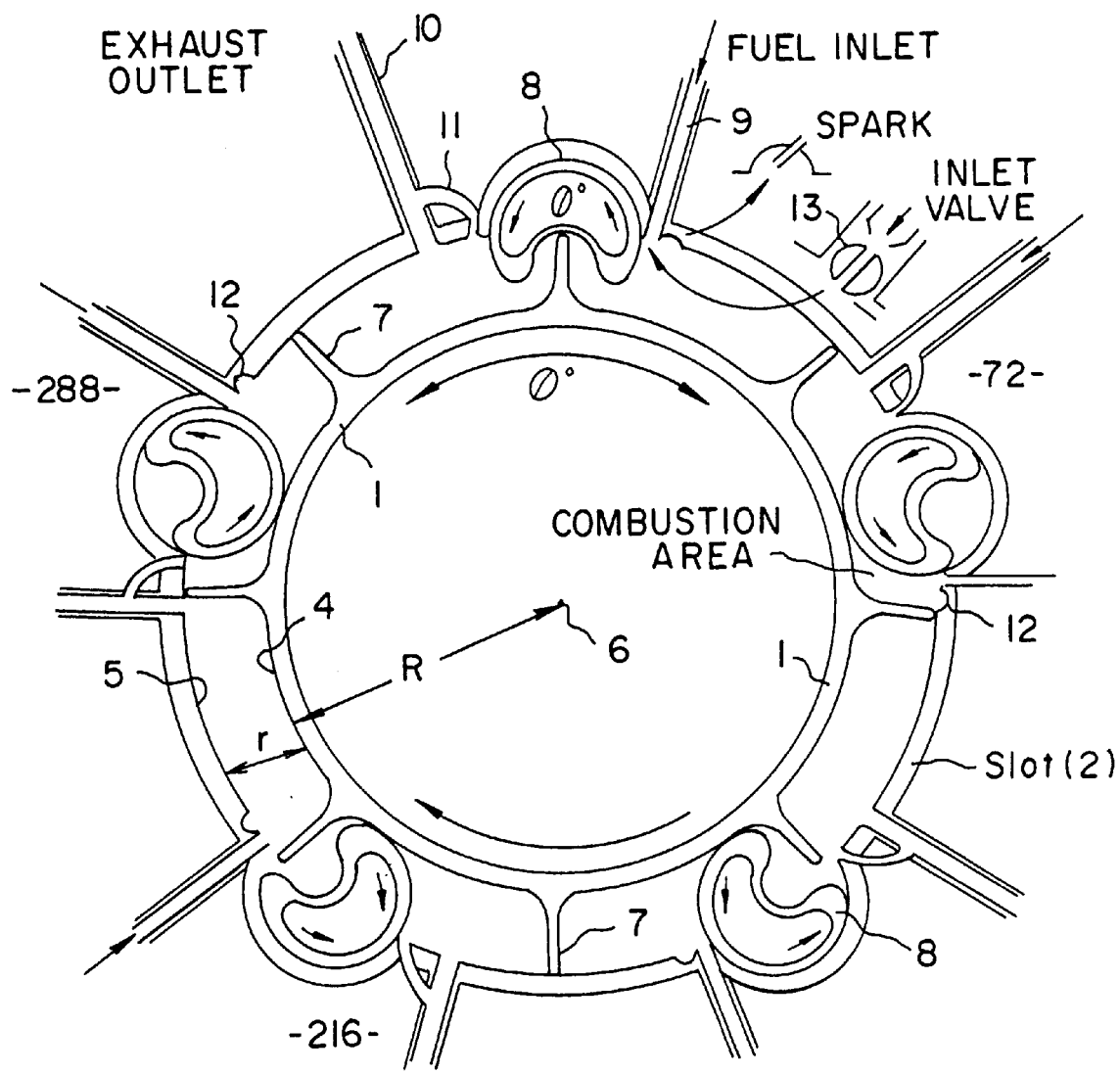
FIG. 1 is a sectional view through a radial vane rotary internal combustion engine according to the invention.

Referring now to the figures of the drawing in detail and first, particularly, to FIG. 1 thereof, there is seen a rotor 1 and a stator 2 which defines the rotor housing. The rotor 1 and the rotor housing are both rotationally symmetrical so that a spacing r between the peripheral surface 4 of the rotor 1 and an inner wall surface 5 of the stator 2 remains constant about the full 360° revolution. A rotational center is indicated by an axis 6. A radius of the rotor housing equals the spacing r plus a radius R of the rotor 1.

A plurality of radial vanes 7 are formed on the periphery of the rotor 1. A radial height of the vanes 7 is substantially equal to the spacing r, so that the vanes 7 seal against the inner wall surface 5 of the housing. Eight vanes 7 are illustrated in FIG. 1. It will become clear from the following description, however, that the number of vanes may be varied depending on whether the engine is to be maximized towards low thrust, high speed or high thrust, low speed. Other factors may be included as well.

The rotational shape of the turning valves 8 may be described as that of a kidney. It is geometrically defined by the number of vanes on the rotor and the relative speed between the rotor and the turning valve. The indentation into each of the otherwise cylindrical valves 8 corresponds exactly to the radial height of the vanes 7 and the turning valve seals against a respective vane or against the peripheral surface of the rotor at any time.

It is important, however, that the number of vanes 7 and the number of valves 8 be carefully coordinated. In general, the number of vanes 7 is greater than the number of valves 8. In the preferred embodiment, we have illustrated five turning valves 8, which number has been found to lead to a particularly smooth cycle. Various ratios of the number of vanes 7 to the number of valves 8 are possible. The ratio is generally a number between 1 and 2, such as for instance 8:5 (illustrated), 7:5, 7:6, 8:7, 6:5 and the like. A radius r of the turning valves 8 equals the spacing r.

The rotation of the rotor in FIG. 1 is clockwise.

A fuel inlet 9 issues into the housing immediately following each of the valves 8 in the rotary direction. An exhaust outlet 10 is located just upstream of each of the valves 8. As shown, the exhaust outlet 10 communicates with the housing with a relatively large opening a few degrees upstream of each of the valves 8 and with an additional bypass 11 immediately adjacent the respective valve 8. The additional bypass 11 ensures that the chamber is maximally purged of exhaust gas before the respective vane 7 starts to seal against the respective valve 8.

A spark plug 12 is located immediately following the fuel inlet 9 in the rotary direction. The ignition spark may thus be timed at only a few degrees engine rotation. The exact spark timing, of course, depends on the fuel compression ratio utilized in the system.

Figure 2:
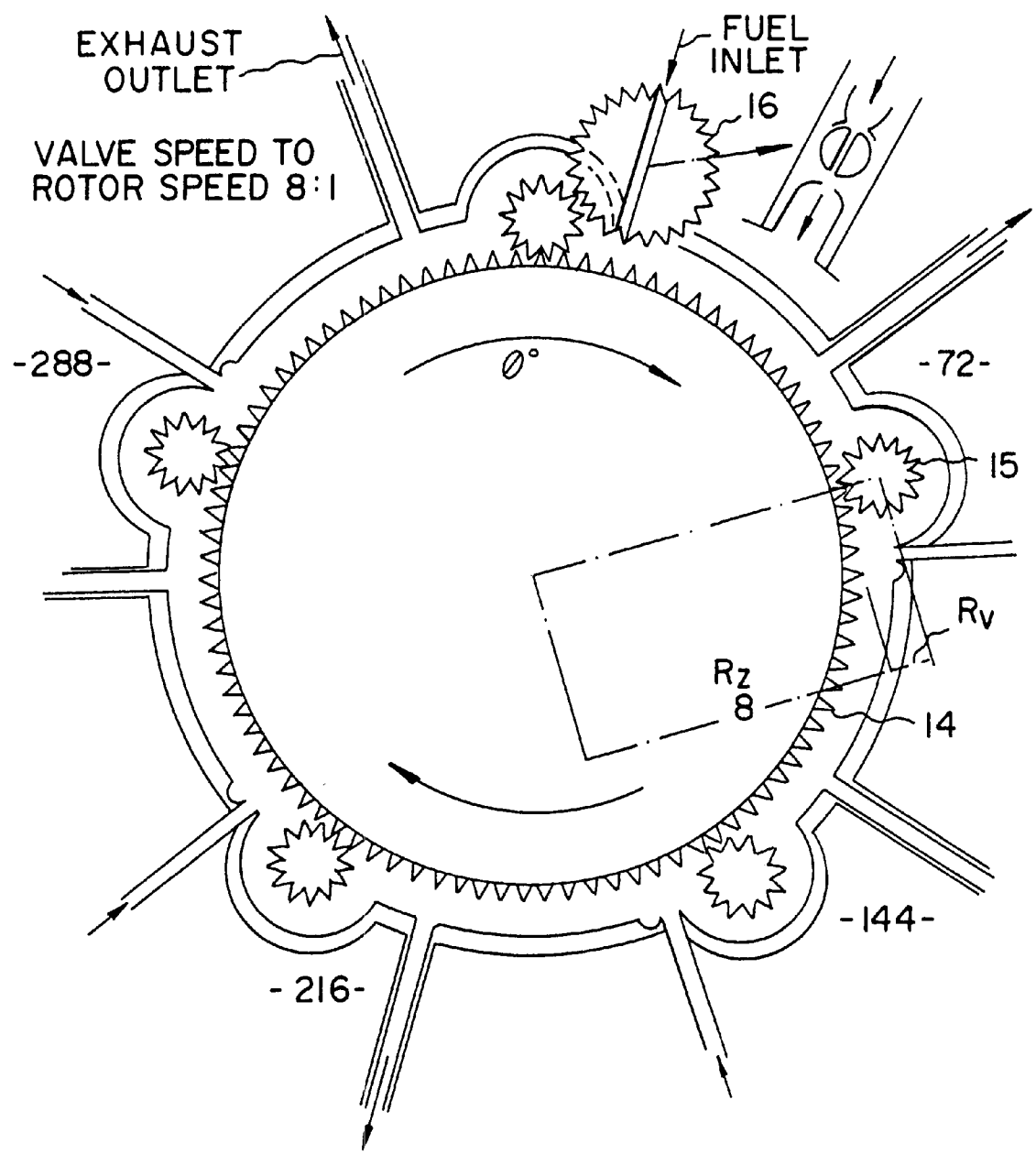
FIG. 2 is a sectional view of a gear train of the engine.

Referring now to FIG. 2, there is illustrated the gearing for the turning valves 8 and a fuel inlet valve 13 disposed in the fuel inlet 9. Alternatively, the fuel inlet valve 13 may also be a one way check valve and the injection may thereby be timed electronically. The gear train is located axially adjacent outside the rotor housing (either on one side or on both sides). It will be appreciated that the prescribed gearing of the rotor 1 relative to the valves 8 must be fully adhered to since, otherwise, the engine would lock and/or be damaged when a vane 7 locks against an ill-timed turning valve 8.

In the preferred embodiment, we use a ratio of 4:1 between the radius R of the rotor and the spacing r. The spacing r and the radial height of the vanes 7 correspond to the radius r of the turning valves 8. The gear ratio between a rotor gear 14 and a valve gear 15 is 8:1 in the preferred embodiment, because there are provided eight vanes 7. This means that the turning valve 8 performs eight full revolutions during one full revolution (360°) of the rotor 1. The valve gear 15 is mounted coaxially with the turning valve 8 (the valve axis is spaced from the center axis 6 by R+r). The effective radius $R_V$ of the valve gear 15 is smaller than the radius r of the valve 8 (the latter corresponds to the spacing r), and the effective radius $R_R$ of the rotor gear is greater than the radius R of the rotor 1. One equation must hold in the preferred embodiment, namely $$R_R + R_V = R + r \qquad (1)$$

where $R_R : R_V = N_V : 1$ and $R : r = 4 : 1$ ($N_V$ = number of vanes). The fuel inlet valve 13 is driven by a fuel valve gear 16 which meshes with the valve gear 15. The gear ratio between the fuel valve gear 16 and the valve gear 15 is 2:1. This means that the fuel valve 13 opens once for every full rotation of the turning valve 8.

Again with reference to FIG. 1, the cycle is as follows: The chamber between the 0° and the 72° valve has just undergone an explosive combustion (power stroke) and the portion of the chamber to the right of the vane 7 is currently being purged of exhaust gas. The chamber immediately following the 72° valve is just being filled with fuel/air mixture and the mixture will be ignited shortly with an ignition spark from the spark plug 12. In other words, the "intake stroke" is about to be completed. In this context, one should rather refer to the fuel loading stroke as a fuel injection stroke, because the fuel/air mixture is in fact injected under pressure from outside the combustion chamber. No timed compression stroke occurs here following the injection stroke. Instead, the fuel is immediately ignited, as soon as the chamber has been properly filled and as soon as the fuel inlet valve 13 is closed.

As best illustrated with the vane 7 currently at 180° (at the bottom of FIG. 1), the power stroke coincides with the exhaust stroke. The same vane 7 which drives the rotor 1 by way of the explosion behind it, also drives the exhaust from the chamber in front of it. Frictional losses suffered in the indirect conversion are thus eliminated.

The effect of compressing the fuel in an internal combustion engine is best explained in thermodynamic terms. There is no reason to bind the compression into the cycle itself, however. The amount of heat released by a given amount of fuel is dictated by the chemistry of the fuel and it is essentially independent of the cycle through which we put the engine. The combustion efficiency is only marginally effected by the pressure at which the combustion occurs.

However, the net work which can be "produced" utilizing the heat release is determined by the engine cycle. The efficiency of an engine cycle is defined as the net work output divided by the heat release of the fuel, and the efficiency increases with the compression ratio. This applies to all internal combustion engine cycles such as the Otto cycle, the Diesel cycle, the Brayton cycle (ideal gas turbine engine cycle), and the proposed rotary cycle.

Figure 3:
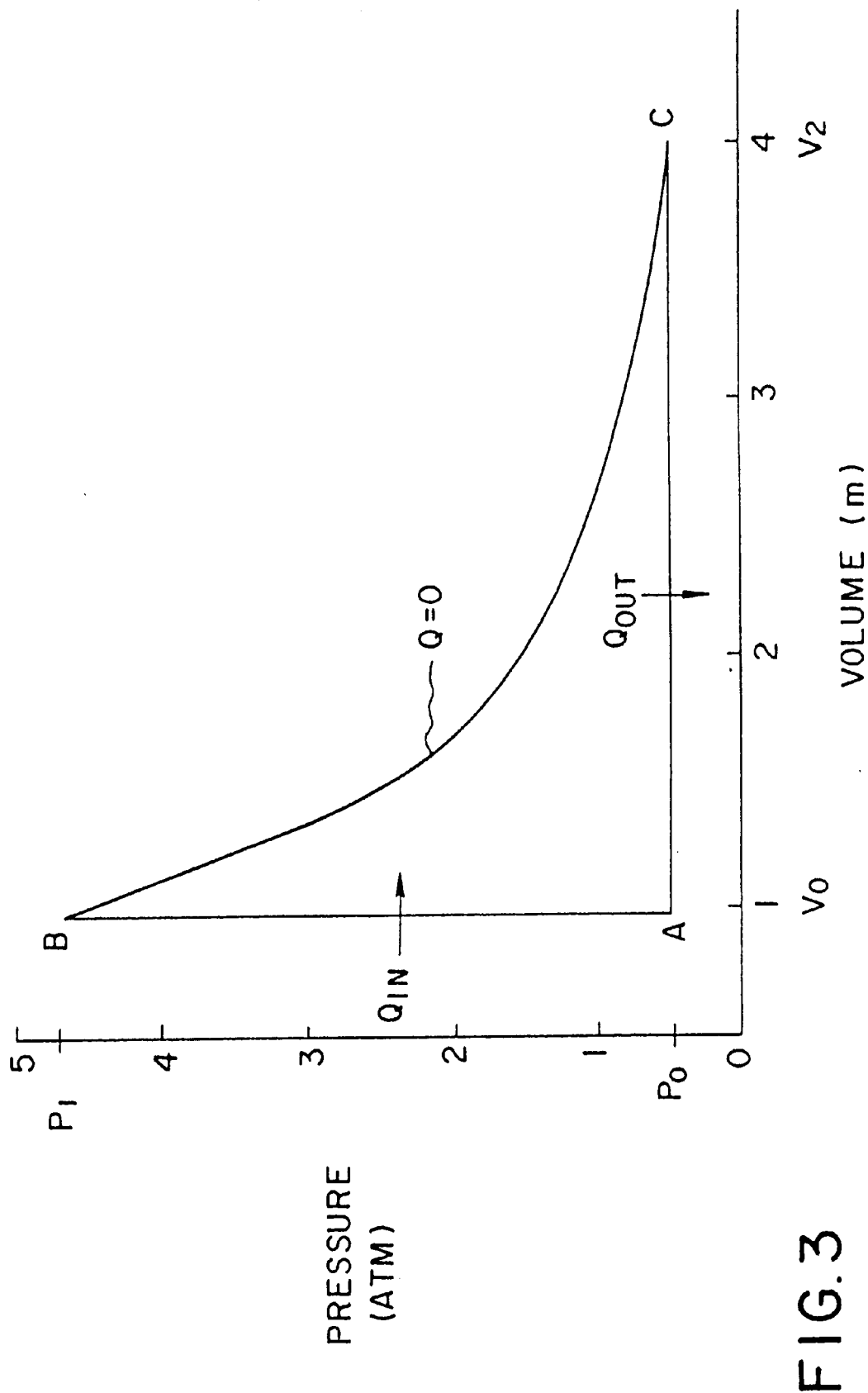
FIG. 3 is a PV diagram illustrating the efficiency of the rotary cycle.

With reference to FIG. 3, which is a thermodynamic PV diagram of an ideal gas, the work output of the cycle is defined as the area enclosed within the cycle ABCA. The greater the enclosed area, the greater the work output of the cycle. As clearly seen, if pressure is not raised during the cycle (from A to C), then the cycle merely reciprocates between the points A and B (volume change) and no area is enclosed by the cycle. Accordingly, work output would be zero.

It is clear that most power producing devices operate on cycles. The various cycles encountered in reality are quite difficult to analyze because of a number of complicating effects, such a friction, non-steady operation within the cycle, and the like. A simplified and idealized model is therefore used to study the effects of the salient features of a cycle without getting bogged down with too much detail. The conclusions reached with such an idealized model provide an indication as to the viability of the cycle. A model of the cycle of the instant application leads to superior results.

To begin with, we have used the air-standard assumptions conventionally used by mechanical engineers in analyzing air breathing internal combustion engines. The working fluid is presumed to be air which circulates in a closed loop and which behaves as an ideal gas. All of the processes which make up the cycle are internally reversible. The combustion process is modeled as a heat addition ($Q_{in}$) process and the exhaust process is modeled as a heat rejection process ($Q_{out}$) which restores the working fluid to its initial state.

Again with reference to FIG. 3, the heat addition $Q_{in}$ occurs at constant volume A-B (i.e., we assume instant explosion without any movement of the vane during the cycle path A-B). The power stroke is produced by the adiabatic (no heat flow) expansion between B and C. The exhaust valve opens at this point and the system expels the gas at constant pressure back from C to A.

We start out with the ideal gas law $$P_o V_o = nRT_o \quad (2)$$

where P is the pressure, V is the volume, T is the temperature, n is the number of moles in the system and R is the universal gas constant. We apply the law to the system:

$$P_1 V_o = nRT_1 \quad (3)$$

$$P_o V_2 = nRT_3 \quad (4)$$

We first look at the cycle path A→B, during which the pressure rises from $P_o$ to $P_1$ in FIG. 3.

$$W = 0$$

$$Q_{in} = \Delta E = mC_p(T_1 - T_2)$$

Next we examine the cycle path B→C, during which the system undergoes a change in pressure and in volume while no heat enters or leaves the system.

$$Q = 0 \quad (5)$$

$$P_1 V_o^\gamma = P_o V_2^\gamma$$

$$\frac{nRT_1}{V_o} = P_o \left(\frac{V_2}{V_o}\right)^\gamma, T_1 = T_o \left(\frac{V_2}{V_o}\right)^\gamma$$

The change in energy $\Delta E$ is expressed as the negative work (work leaving the system by thermodynamic convention).

$$\Delta E = -W_{BC} = mC_v(T_2 - T_1) = mC_v \left[\frac{P_o V_2}{nR} - T_o \left(\frac{V_2}{V_o}\right)^\gamma\right]$$

$$W_{BC} = -mC_v \left[\frac{P_o V_2}{nR} - \frac{P_o V_o}{nR}\left(\frac{V_2}{V_o}\right)^\gamma\right] = -\frac{mC_v P_o V_o}{nR}\left[\frac{V_2}{V_o} - \left(\frac{V_2}{V_o}\right)^\gamma\right]$$

$$mC_v T_o \left[-\frac{V_2}{V_o} + \left(\frac{V_2}{V_o}\right)^\gamma\right]$$

The efficiency η of the system may now be expressed as the ratio of work done during the "active" cycle path BC divided by the amount of heat injected into the system.

$$\eta = \frac{W_{BC}}{Q_{in}} = \frac{T_o\left[\left(\frac{V_2}{V_o}\right)^\gamma - \left(\frac{V_2}{V_o}\right)\right]}{(T_1 - T_o)}, \frac{T_1}{T_o} = \left(\frac{V_2}{V_o}\right)^\gamma$$

$$\eta = \frac{\left(\frac{V_2}{V_o}\right)^\gamma - \frac{V_2}{V_o}}{\left(\frac{V_2}{V_o}\right)^\gamma - 1} = \frac{R^\gamma - R}{R^\gamma - 1}, \text{ where } \frac{V_2}{V_o} = R$$

it follows that $$\eta_c = 1 - \frac{T_o}{T_1} = 1 - \left(\frac{V_o}{V_2}\right)^\gamma = 1 - R^{-\gamma}$$

Figure 4:
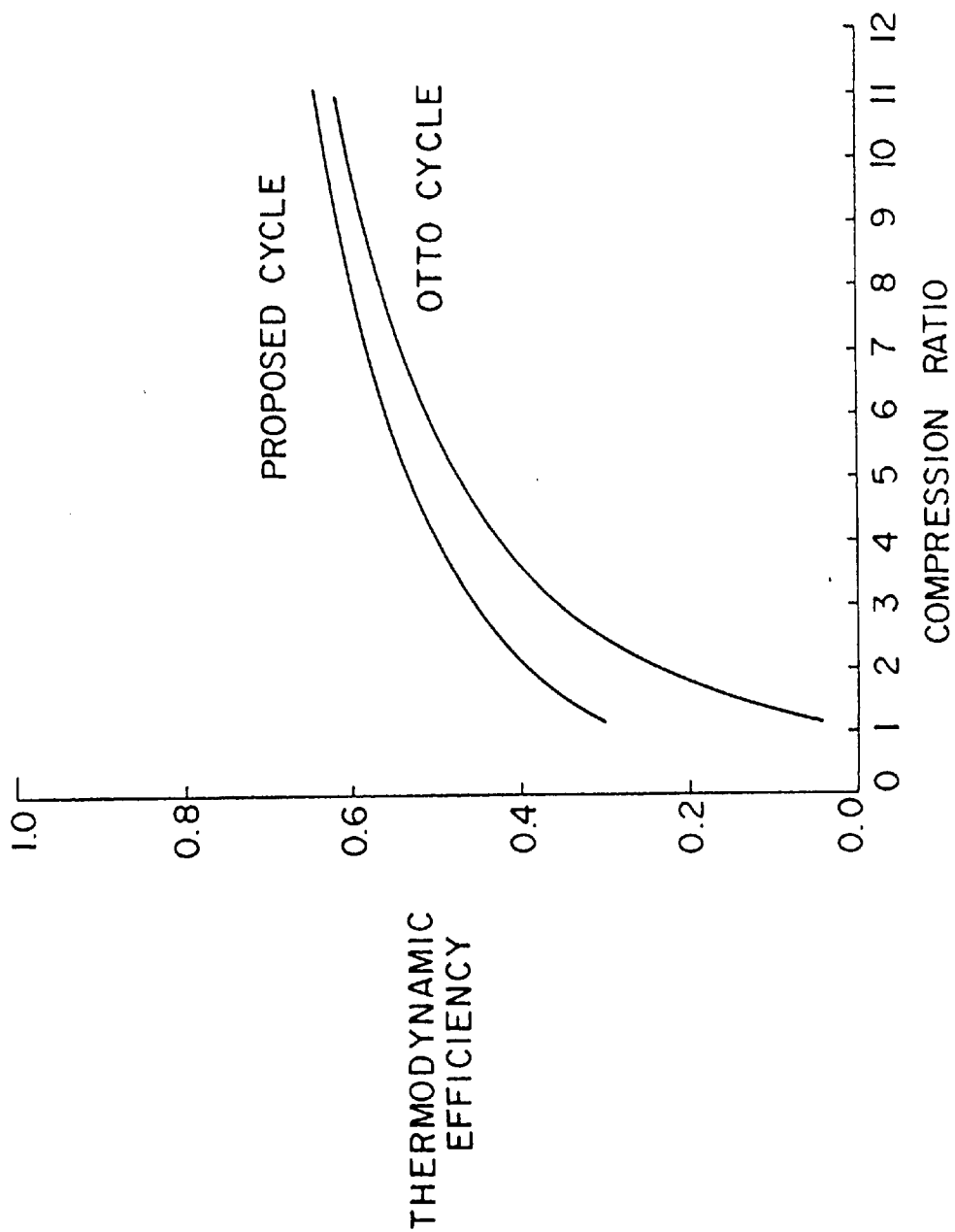
FIG. 4 is a comparative plot illustrating the thermodynamic efficiency of the novel rotary cycle and that of an Otto cycle over a compression ratio.

With reference to FIG. 4, the efficiency of the cycle of the instant application as compared with the Otto cycle is quite meritorious. Similarly to the Otto cycle, the efficiency of the novel cycle improves with the compression ratio. However, the proposed cycle is substantially superior at lower compression ratios. As a backup, we also computed the Carnot efficiency between the same two temperatures and compared the same to the above results. The Carnot efficiency (not illustrated for purposes of clarity) was indeed located well above both the proposed cycle and the Otto cycle, which verifies that the second law of thermodynamics was not violated in our calculations.

Figure 5:
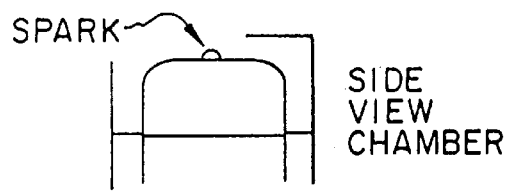
FIG. 5 is a partial side view illustrating a chamber and a sealing vane.

With reference to FIG. 5, the ignition spark may be injected axially symmetrically within the chamber. Lateral sparking is possible as well, and in particular double sparking in each combustion chamber (igniting from both sides of the chamber).

Figure 6:
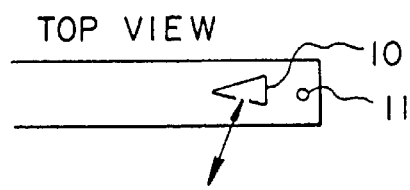
FIG. 6 is a top view showing an exhaust outlet.

With reference to FIG. 6, the top view illustrated therein is of the exhaust duct 10. The cross-section of the main exhaust opening is triangular, with the base of the triangle disposed in the rotary direction of the rotor. The triangular shape has been found to act similarly to a muffler and exhaust noise and the like is prevented with the exhaust baffle of the invention.

Figure 7:
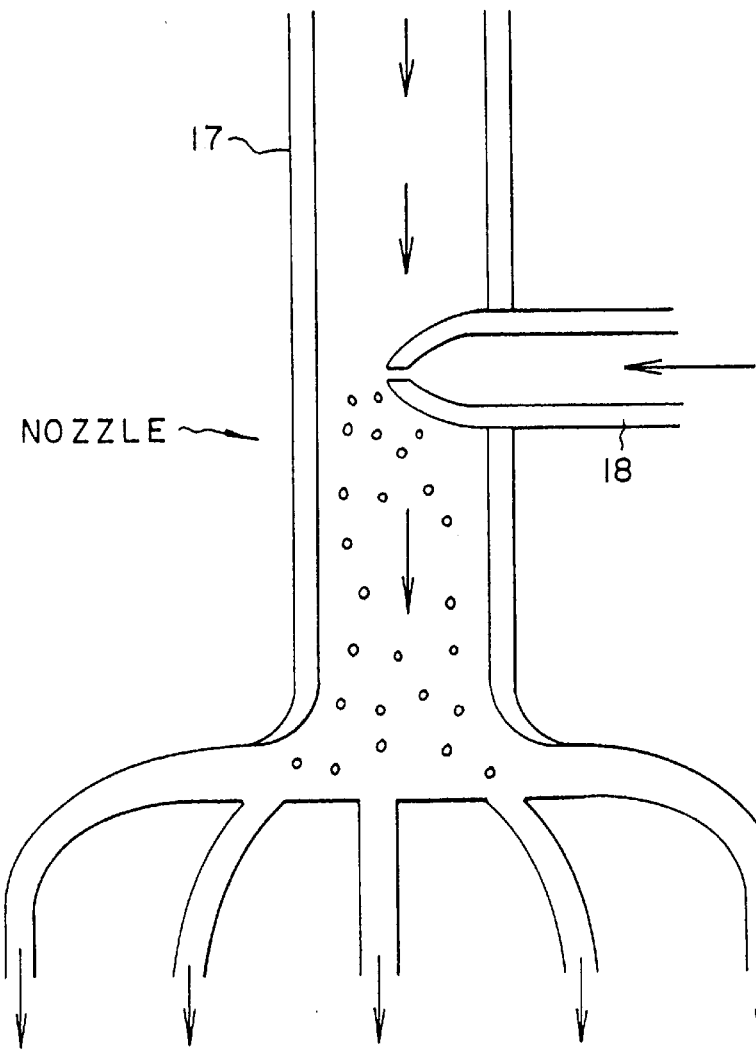
FIG. 7 is a partial diagrammatic view of a fuel inlet with an atomizing injector nozzle.

With reference to FIG. 7, several possibilities exist with regard to the injection of the fuel into the combustion chamber. As noted above, the efficiency of the engine improves with a higher compression ratio. In the diagram, fresh air enters at a fresh air inlet 17, into which a gasoline spray is injected from a nozzle 18. Both or either one of the air and gasoline may be pressurized by an external turbine compressor driven via a power shaft of the rotor 1. The turbine compressor may be either directly driven or through a generator and electromotor assembly. The gasoline may be atomized prior to injection into the fresh air inlet 17 or by the injection itself. The ideal compression ratio, as in all internal combustion engines, is defined by a compromise. In an ideal thermodynamic sense, the higher the compression ratio, the higher the engine efficiency. However, fuel/air mixtures will ignite under pressure without an ignition spark (e.g. engine knock). Pre-ignition reduces the efficiency and it may lead to damage. Most currently available gasolines allow a compression ratio of 12:1 and typical compression of modern mass model engines is between approximately 9:1 and 10:1.

At a compression ratio of 12:1 the absolutely best efficiency which may be obtained under ideal conditions would be 60% according to the second law of thermodynamics. Frictional losses, heat losses by conduction to the cooling system, and the like, reduce the engine efficiency to about 25%. Initial tests with the system of the instant application have shown that the efficiency of the novel engine are well within that range.

Figure 8:
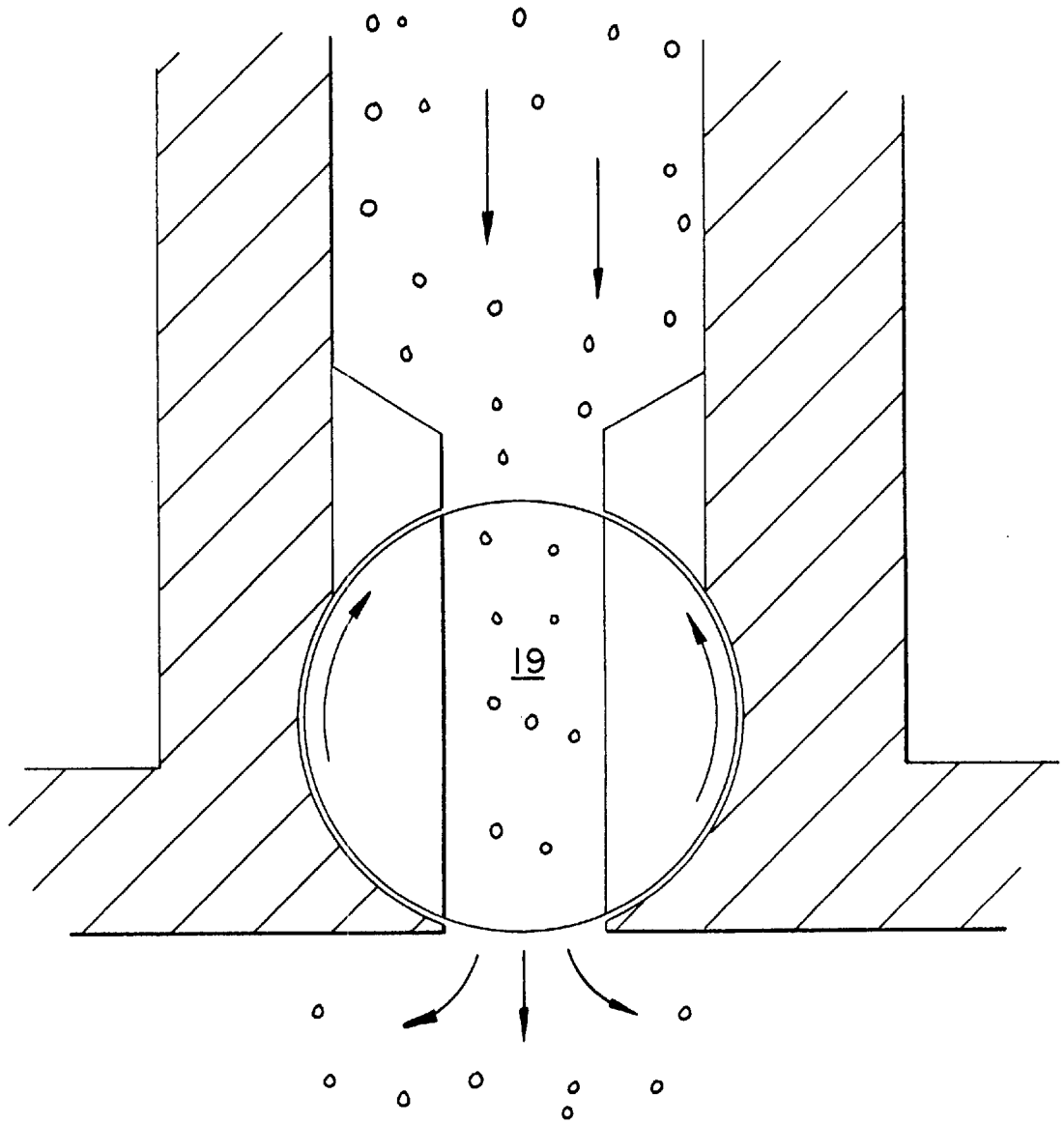
FIG. 8 is a partial section showing a rotary fuel inlet valve in the fuel inlet.

With reference to FIG. 8, the fuel inlet valve 13 is a rotary valve with an opening duct 19 which aligns itself with the fuel inlet duct every 180° rotation. The fuel/air mixture is quickly injected during the alignment and, immediately, after injection the valve remains closed until the it is again time to inject fuel into the chamber.

Figure 9:
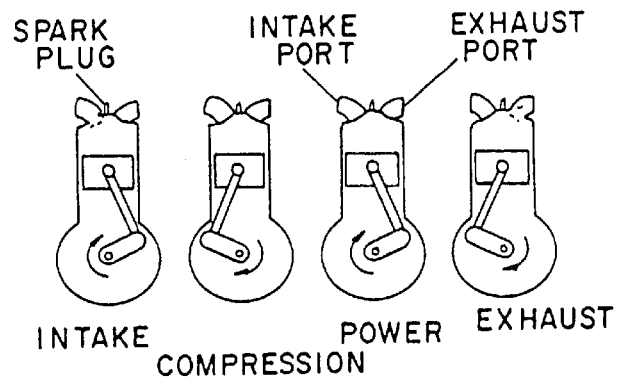
FIG. 9 is a diagrammatic view of a prior art Otto cycle.

With reference to FIG. 9, there is illustrated a sequential cycle typical for an Otto engine. The cycle includes the conventional intake, compression, power, and exhaust strokes. The compression is effected within the combustion chamber in that, after the fuel/air mixture has been admitted into the chamber, the same is closed, and the piston reduces the volume of the chamber. This is quite similar in the Wankel cycle.

Figure 10:
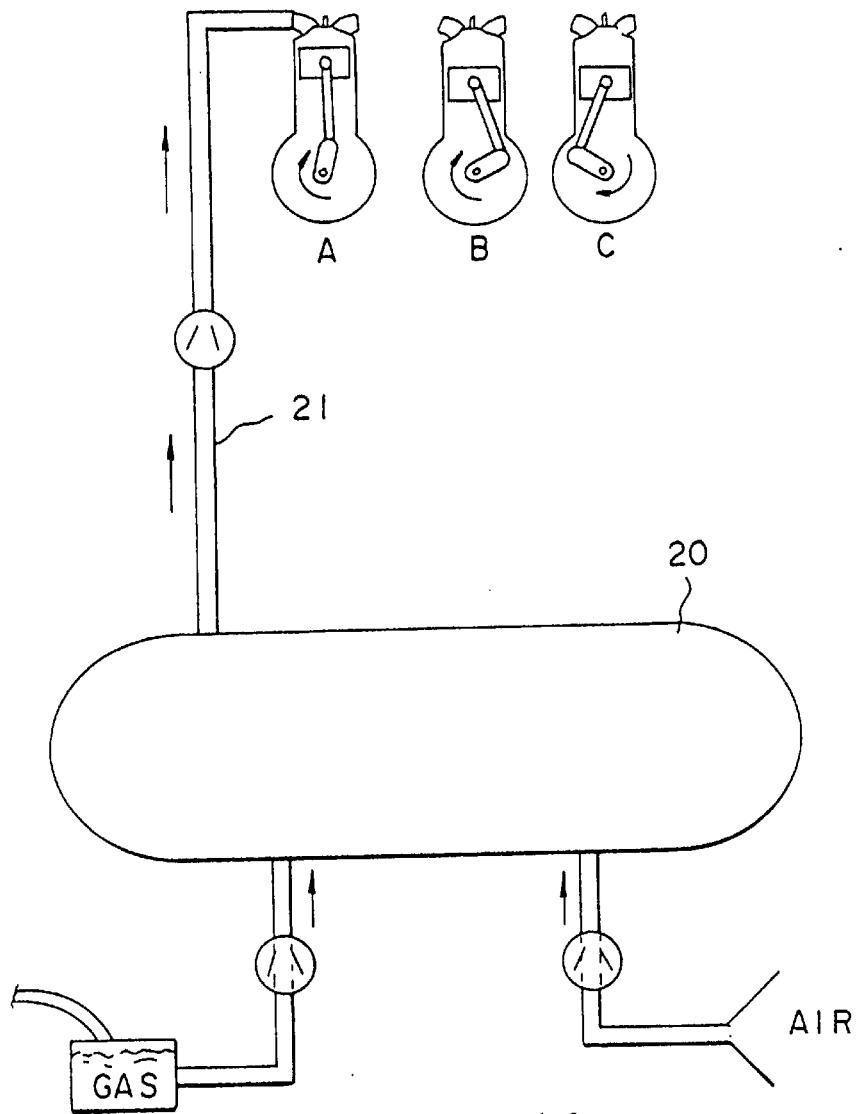
FIG. 10 is a diagrammatic view showing an external compression system.

The instantly claimed invention, on the other hand, utilizes external compression, i.e., compression outside of the combustion chamber. As illustrated in FIG. 10, there is provided a pressure vessel 20, into which the fuel and the air (or any other suitable fuel/oxidant combination) have been pumped. The compressed mixture from the pressure vessel 20 then travels through a line 21 and into the combustion chamber. The injection of compression (or uncompressed) mixture is exactly timed: The injection starts just before the piston has reached TDC (top dead center) and is essentially ended at TDC. The ignition is timed as in conventional engines. In the case of the rotary engine, the mixture is injected as soon as the turning valve just passed by the respective vane is closed. The forward movement of the vane also aids in the injection due to the vacuum effect of the expanding chamber volume.

Figure 11:
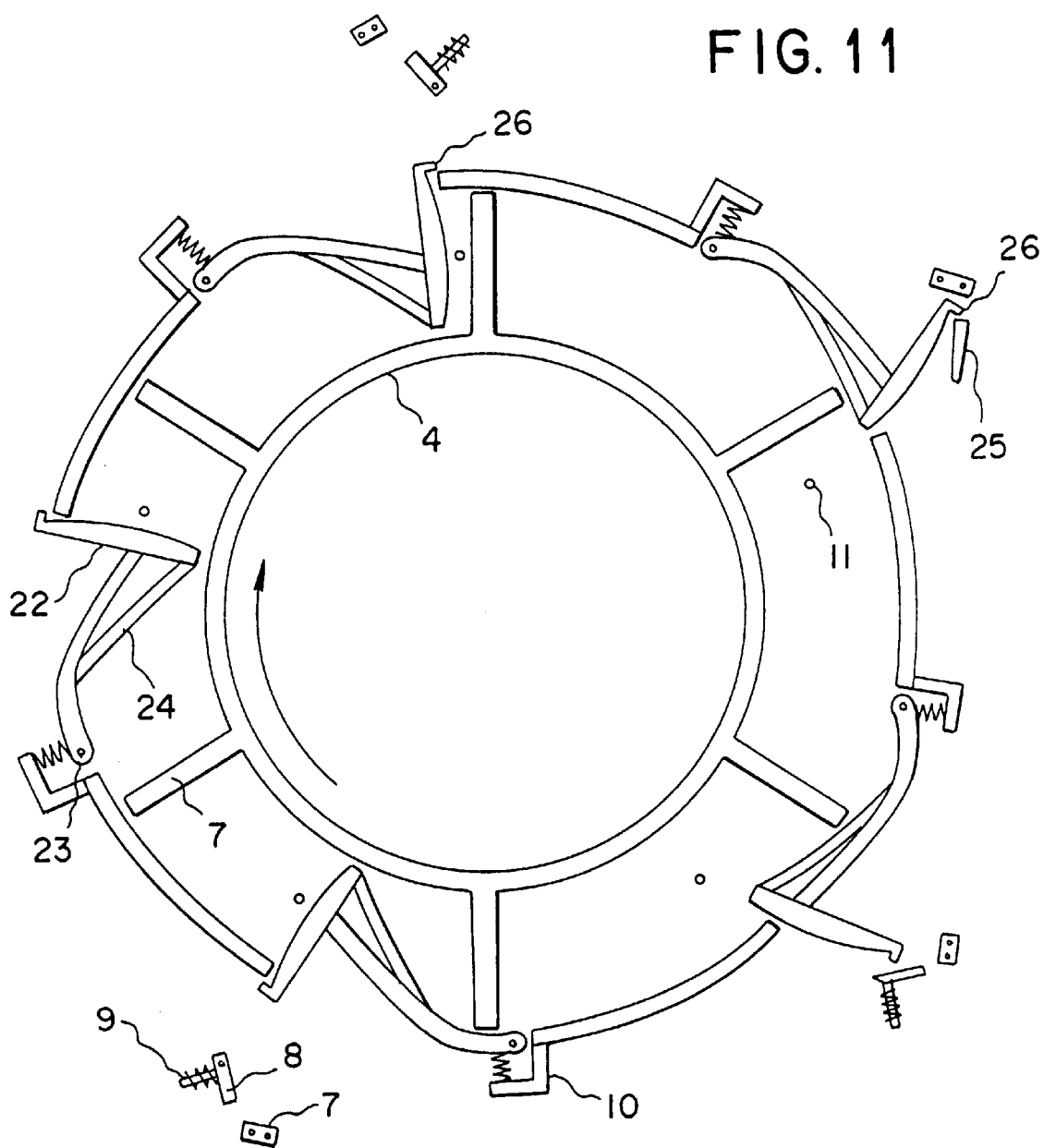
FIG. 11 is a side view of an alternative embodiment of the rotary engine according to the invention.

With reference to FIG. 11, a variant of the rotary engine utilizes radially oscillating valves 22 instead of the turning valves 8. In the embodiment shown, the reciprocating valves 22 are articulated about a point 23 which is located on the wall of the rotor housing. The valves 22 are each provided with a ramp 24. Even if a valve is not raised prior to the arrival of a vane 7, it will be raised by the vane 7 which runs onto the ramp 24. A pawl 25 is disposed so as to hold the valve 22 at the outermost position (shown at the 72° valve). The pawl 25 engages in a hook 26. By appropriately controlling the various pawls 25 it is possible to operate the engine with fewer than all combustion chambers at all times. For instance, if low speed coasting operation is desired, or some other no load or small load operation, it is possible to hold any number (even all) of the valves outside the rotor housing, not to inject any fuel and not to ignite any sparks. This, in fact, is one of the major advantages obtained with the novel engine, namely that the cycle does not include a compression stroke even in no-load situations.

Figure 12:
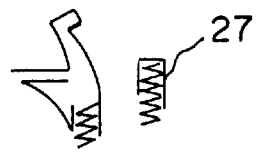
FIG. 12 is a partial view thereof.

With reference to FIG. 12, the vanes 7 may be provided with a spring-loaded knife seal 27. The valves 22 may be provided with a spring-loaded knife seal 28.

Figure 13:
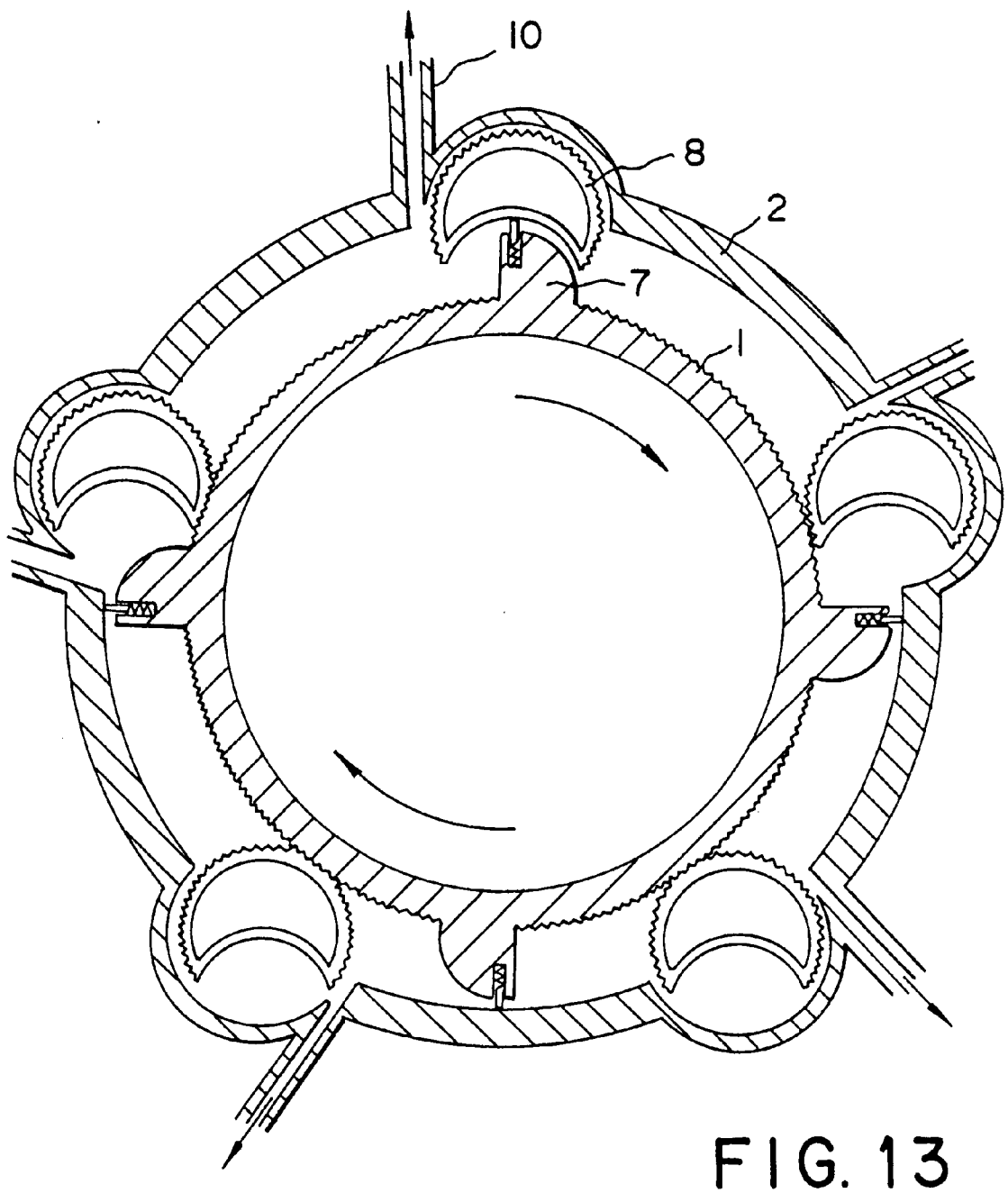
FIG. 13 is a side view of another alternative embodiment of the rotary engine.

With reference to FIG. 13, which utilizes a ratio of 4:5 in the vane:valve relationship, the radial vanes 7 exhibit a shape which more closely resembles the inner cut of the kidney-shaped turning valves 8. In addition, the vanes are provided with spring-loaded knife seals. Finally, the embodiment of FIG. 13 utilizes internal gearing. In other words, the gearing between the rotor 1 and the valves 8 is provided inside the rotor housing. For reasons of clarity, the inlet port and the spark port have been omitted from FIG. 13. It should be noted, however, that injection and the spark ignition may be effected in the side walls of the rotor housing.

Figure 14:
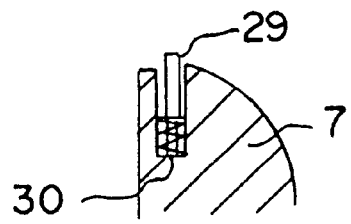
FIG. 14 is a partial view thereof.

With reference to FIG. 14, the knife seal 29 projects radially from the vane 7. A spring 30 biases the seal 29 outwardly against the valve 8 or against the inner wall of the rotor housing.

I claim:

1. A rotary internal combustion engine, comprising:

a stator defining a rotor housing with a cylindrical inner wall surface, a rotor rotatably supported in said housing about a rotor axis, said rotor having a cylindrical peripheral surface rotating equidistantly from said inner wall surface of said stator;

a plurality of vanes projecting substantially radially from said peripheral surface of said rotor and sealing against said inner wall surface of said stator;

a plurality of substantially hollow, kidney-shaped turning valves disposed at a periphery of said housing chamber and equi-angularly distributed about the periphery, each of said turning valves rotating about an axis extending parallel to said rotor axis and coinciding with said inner wall surface of said rotor housing, each of said turning valves sealing against said peripheral surface of said rotor and, while allowing a respective one of said vanes to pass by, sealing against said vane;

said plurality of vanes being a number different from a number of said plurality of turning valves, with a ratio of vanes to turning valves being 8:5;

said cylindrical inner wall surface of said stator together with said cylindrical peripheral surface of said rotor, a respective vane of said plurality of vanes, and a respective one of said turning valves defining an internal combustion chamber;

means disposed on said housing for igniting a combustible material in said combustion chamber; and a plurality of exhaust ducts each having an opening with a triangular cross-section communicating with said rotor housing immediately upstream of a respective one of said valves in the rotary direction of said rotor.

\* \* \* \* \*